(12) United States Patent
Filho

(10) Patent No.: US 6,715,576 B2
(45) Date of Patent: Apr. 6, 2004

(54) MECHANICAL TRANSMISSION FOR AGRICULTURAL VEHICLES OF ADJUSTABLE TRACK WIDTH

(75) Inventor: Ricieri Squassoni Filho, Sao Paulo (BR)

(73) Assignee: Maquinas Agricolas Jacto, S.A., Pompeia (BR)

( * ) Notice: Subject to any disclaimer, the term of this patent is extended or adjusted under 35 U.S.C. 154(b) by 240 days.

(21) Appl. No.: 10/037,983

(22) Filed: Jan. 4, 2002

(65) Prior Publication Data

US 2002/0094905 A1 Jul. 18, 2002

(30) Foreign Application Priority Data

Jan. 15, 2001 (BR) ............................................. 0100322

(51) Int. Cl.$^7$ ............................................. B60B 35/10
(52) U.S. Cl. ...................... 180/209; 180/340; 180/906; 475/225
(58) Field of Search ................................ 180/209, 906, 180/340; 280/638; 475/221, 225

(56) References Cited

U.S. PATENT DOCUMENTS

| | | | | | |
|---|---|---|---|---|---|
| 1,352,130 A | * | 9/1920 | James | ...................... | 475/230 |
| 1,379,770 A | * | 5/1921 | Lucand | ...................... | 475/225 |
| 2,644,540 A | * | 7/1953 | Balzer | ...................... | 180/211 |
| 2,885,018 A | * | 5/1959 | Jackson | ...................... | 180/340 |
| 3,782,491 A | * | 1/1974 | Herbenar | ...................... | 180/435 |
| 4,969,530 A | * | 11/1990 | Kopczynski | ............ | 180/24.09 |
| 5,282,644 A | * | 2/1994 | Larson | ........................ | 280/638 |
| 5,326,128 A | * | 7/1994 | Cromley, Jr. | ............... | 280/656 |
| 5,464,243 A | * | 11/1995 | Maiwald et al. | ............ | 280/638 |
| 6,139,045 A | * | 10/2000 | Vandenbark et al. | ......... | 280/638 |
| 6,145,610 A | * | 11/2000 | Gallignani | ................. | 180/9.48 |
| 6,176,334 B1 | * | 1/2001 | Lorenzen | ................... | 180/9.48 |
| 6,206,125 B1 | * | 3/2001 | Weddle | ....................... | 180/209 |

* cited by examiner

Primary Examiner—Paul N. Dickson
Assistant Examiner—Deanna Draper
(74) Attorney, Agent, or Firm—Michael J. Striker

(57) ABSTRACT

A mechanical transmission for agricultural vehicles of adjustable track width has gear cases disposed vertically to elevate a chassis height of vehicle above a plantation, rear axles provided for wheels of the machine and mounted to the gear cases, first gears and second gears located in the gear cases and coupling the axles and also being interconnected with one another, a differential to which torque is transmitted from the axles through the second gears which are upper gears, a cross tube, the gear cases having substantially first horizontal extensions which are fitted on the cross tube so as to allow sliding outwards or inwards of the extensions in order to modify a machine track width, the differential having two second extensions, grooved shafts which are fixedly connected to the second gears, first tube bushings which are connected with the gear cases and in which the grooved shafts are fitted, second bushings having internal grooves and surrounding the grooved shafts, tubes which are fixed to the gear cases concentrically to the gears, the second extensions of the differential being fitted in a sliding and tight way within the tubes concentrically to the second gears, acting as a support to a differential assembly which is suspended by the gear cases.

7 Claims, 2 Drawing Sheets

MECHANICAL TRANSMISSION FOR AGRICULTURAL VEHICLES OF ADJUSTABLE TRACK WIDTH

BACKGROUND OF THE INVENTION

The present invention relates to a mechanical transmission for agricultural vehicles of adjustable track width.

More particularly it relates to a mechanical transmission of this type which is to be adapted to agricultural machines designed for agrochemical spraying, liquid fertilizer application, etc., that require the machine to move over the culture with its tires passing between the plant rows.

It is known for agricultural machine to be elevated to pass over the plants of a certain culture. The rear axles of these machines are mounted to lower bearings of a gear case, which extend upwards where they encounter the input shaft of the machine transmission. In these conventional machines the differential is fixed to the chassis structure, and from it the axle shafts extend with universal joint shafts and retractable axles, which engage to the upper gears of the cases that transmit motion to the wheels. The universal joint shafts are essential to compensate the vertical motions of the rear suspension in relation to the chassis of the vehicle. However, the presence of the universal joint shafts delimits the transverse space available between the rear wheels and therefore delimits the track width alteration from a maximum value to a minimum value. Thus, a track width change of a machine can not be carried out by only one pair of retractable axles but requires other pairs of retractable axles with other length, which in turn requires disassembling and reassembling of the machine for such replacement.

When the agricultural vehicle of adjustable track width has a mechanical transmission, the track width change requires more than a single alteration of the distance between the wheels, even if it is carried out with assistance of hydraulic cylinders. The intervention must be made in a workshop and even occasionally in the field, however with the machine stopped because some components must be replaced.

SUMMARY OF THE INVENTION

Accordingly, it is an object of the present invention to provide a mechanical transmission for agricultural vehicles of adjustable track width, which avoids the disadvantages of the prior art.

More particularly, it is an object of the present invention to provide a mechanical transmission for agricultural vehicles of adjustable track width, which does not require a replacement of the components, allowing the track width adjustment of the machine to be carried out without stopping the machine at a workshop.

It is another object of the present invention to provide a mechanical transmission for agricultural vehicles of adjustable track width, which maintains the needed axles alignment, dispensing with the use of universal joint shafts, thus allowing the track width change with the machine in motion.

Finally, it is still another object of the present invention to provide a mechanical transmission for agricultural vehicles of adjustable track width, which configures a track width adjusting system to adapt the machine to any row spacing or plant row, for various types of cultures.

In keeping with these objects and with others which will become apparent hereinafter, one feature of present invention resides, briefly stated, in a mechanical transmission for agricultural vehicles of adjustable track width, which has gear cases disposed vertically to elevate a chassis height of the machine above a plantation; rear axles provided for wheels of the machine and mounted to said gear cases; first gears and second gears located in said gear cases and coupling said axles and also being interconnected with one another; a differential to which torque is transmitted from said axles through said second gears; a cross tube, said gear cases having substantially first extensions which are fitted on said cross tube so as to allow sliding outwards or inwards of said extensions in order to modify a machine track width, said differential having two further extensions; grooved shafts which are fixedly connected to said second gears; first tube bushings which are connected with said gear cases and in which said grooved shafts are fitted; second bushings having internal grooves and surrounding said grooved shafts; tubes which are fixed to said gear cases concentrically to said gears, said second extensions of said differential being fitted in a sliding and tight way within said tubes concentrically to said second gears, acting as a support to a differential assembly which is suspended by said gear cases.

When the mechanical transmission for agricultural vehicles of adjustable track width is designed in accordance with the present invention, it eliminates the disadvantages of the prior art and provides for the above mentioned highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
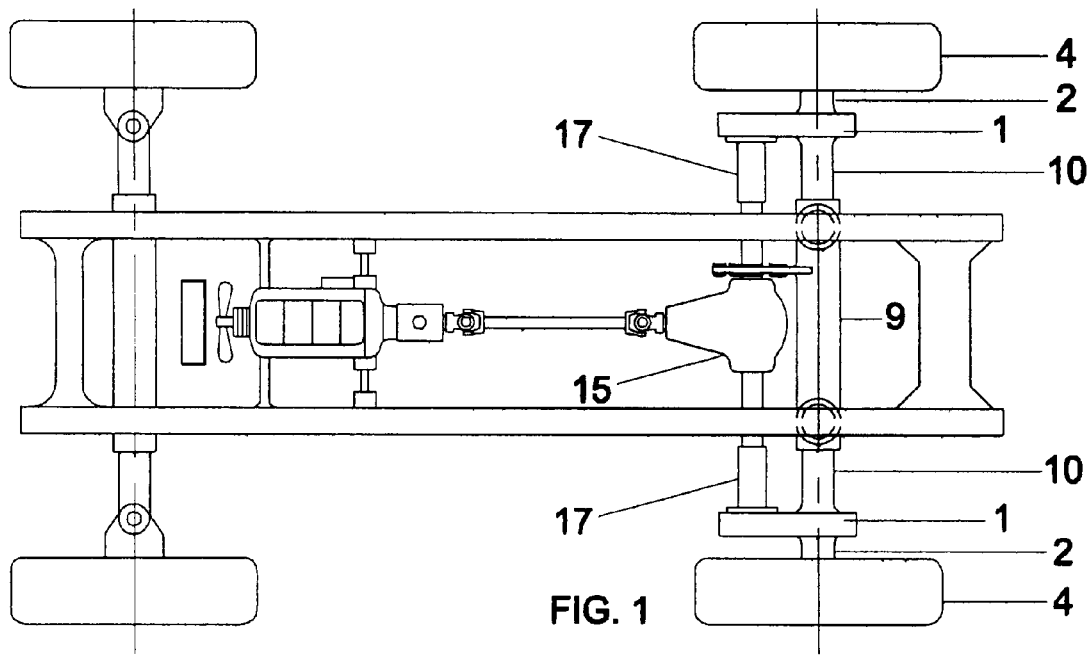
FIG. 1 is a plan view of a chassis and a transmission assembly of an agricultural vehicle with an installed mechanical transmission for adjustable track width in accordance with the present invention.
Figure 2:
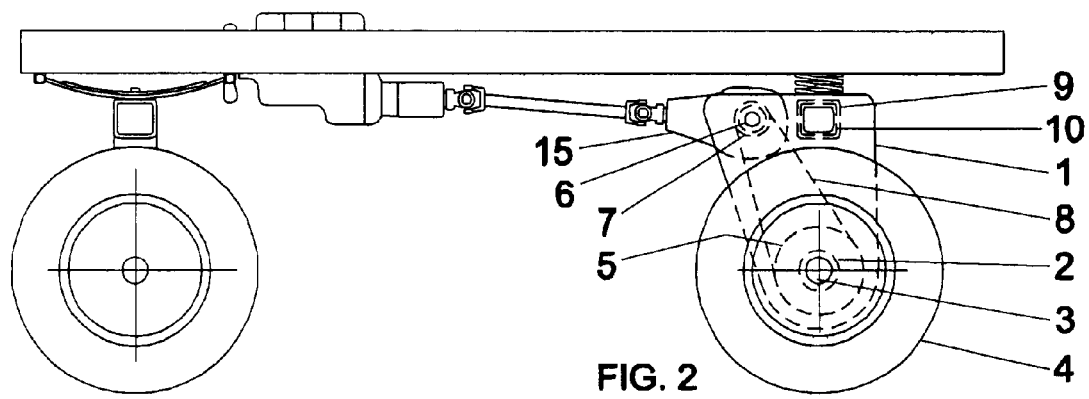
FIG. 2 is a side elevational view of the assembly shown in FIG. 1 with the mechanical transmission for adjustable track width.

A mechanical transmission for agricultural vehicles of adjustable track width in accordance with the present invention is shown in the drawings as an example, with the transmission located between the rear wheel axles and the traction axles at a high level in the machine defined by the use of chains with gears for chains. The transmission can be carried out by common gears belonging to the wheel axles, to the traction axles, and idler gears between them.

Figure 3:
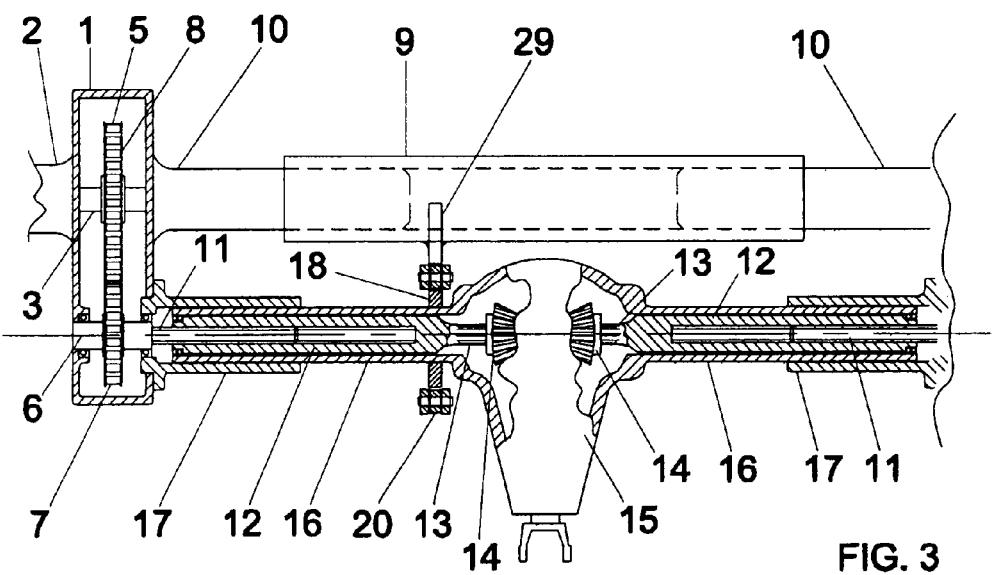
FIG. 3 is a view showing the longitudinal section of a traction rear axle with corresponding parts of the transmission.
Figure 4:
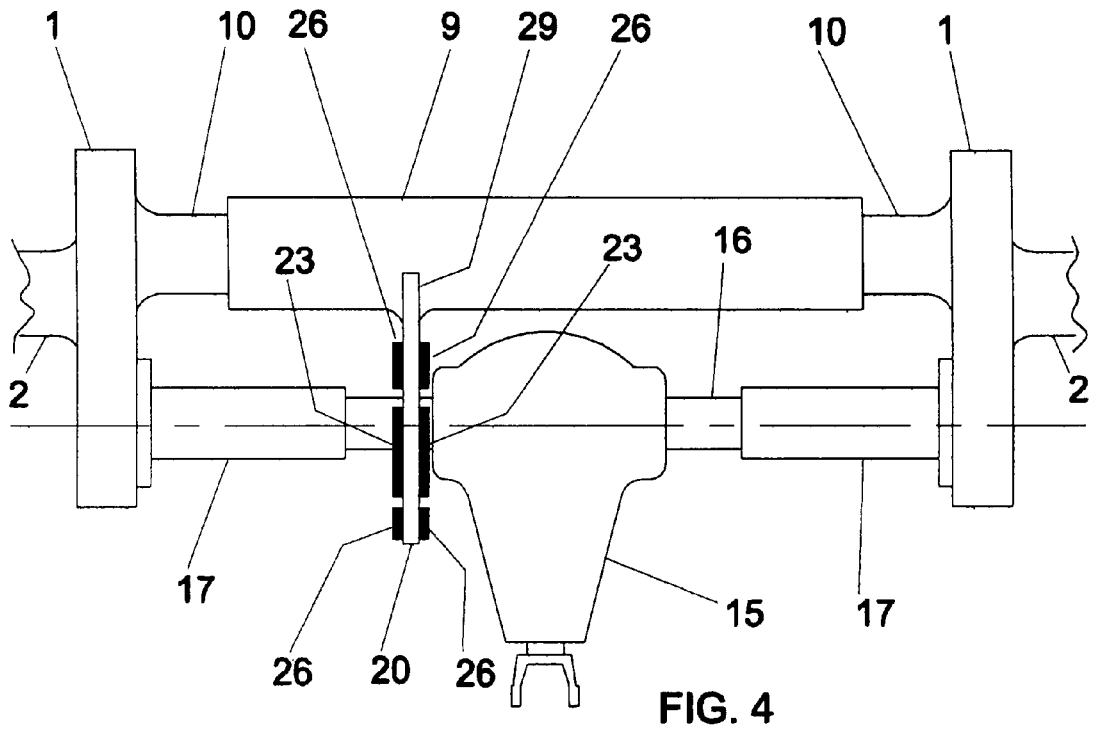
FIG. 4 is a partial plan view of a detail of the mechanical transmission for adjustable track width with the rear axle showing a totally reduced track width.

The mechanical transmission for agricultural vehicles of adjustable track widths includes one pair of gear cases 1, each provided on a lower part with an antifriction bearing 2 for a respective axle 3 of a wheel 4 as shown in FIG. 3. This axle has, inside the gear case 1 a gear 5 which is formed as a roller gear for a chain 8.

The gear case 1 in its upper part has another axle 6 which is parallel to the axle 3 of the wheel 4 and has a gear 7 for the chain 8. The latter is located inside the gear case 1 to transmit the motion of the gear 7 to the gear 5.

A prismatic tubular cross beam or tube 9 is located externally to the gear cases 1 and belongs to a moving part of the vehicle wheel rear suspension. The crossbeam 9 is located transversely, receiving the fitting through its both borders from extensions 10 which extend from the gear cases 1. Therefore the extensions slide in opposite direction and provide a change of the track width of the wheels 4, keeping the set stabile and strain resistant. The sliding of the extensions 10 can be effected mechanically or by hydraulic cylinders.

Each gear 7 of the upper part of the gear case 1 has a grooved shaft 11 which extends parallel to the extension 10. It has a greater length than the displacement for widening the track width to maximum and minimum, on this side of the vehicle. Each grooved shaft 11 is fitted in a grooved bushing 12. Its hollow part can receive the entire grooved shaft 11 when the machine track width is reduced to the minimum. The grooved bushing 12 on its end has a section 13 of a smaller diameter with an external groove. It is lodged in a conical gear 14 of an output of the differential 15 located in the center of the vehicle as shown in FIG. 3.

The differential 15 includes tubular extensions 16 with bearings at the ends which support the grooved bushing 12. The differential 15 is supported by the two gear cases 1 through tubes 17 which are fixed by flanges to the cases and centered by the shafts 6 and their grooved shafts 11. The tubes 17 receive the tight and sliding fitting of each tubular projection 16 of the differential 15. These tubes 17 cover the respective grooved shafts so as to protect them and keep them lubricated. The differential 15 transmits a rotation movement of each shaft 6, allowing axle movements of the same and following the respective gear cases 1 during the change of the track width.

The grooved shaft 11 slides longitudinally on the grooved bushings 12 between the maximum and the minimum track width, so that its grooves are never disengaged. This is possible because no universal joint shafts are utilized between the differential 15 and the shafts 6 providing an additional space which is now utilized for the increase of the length of the grooved shafts 11 and of the grooved bushing 12. In this inventive construction the differential 15 becomes practically reciprocal to the tubular cross beam 9 of the vehicle rear suspension.

The fitting of the extensions 10 of the gear cases 1 on the suspension crossbeam 9, even though with a little gap to allow the sliding, can cause little alignment deflections between the grooved shafts 11 and the single line of the tubular extensions 16 of the differential 15, hence the differential 15 instead of being fixed to the cross beam 9 is supported by the fittings of the extension.

The torsional reaction to which the differential 15 is subjected when it transmits torque to its axle shaft is provided by a set of plates located perpendicularly to one of the tubular extensions 16. These plates include one plate 18 which is fixed to the extension and has above and below two holes 19, and another external plate 20 with a similar external contour and a gap that allows little movements and with two holes 21 located in the same level of the holes 19 of plate 18 and in the same side of the plate 18, one above the other. Pins 22 extend in the holes of the two plates and are fitted in holes of four rods 23 of a sheet, so that one pair connects the upper pins and the upper pair connects the lower pins located parallel to one another and leaning against opposite faces of the plates.

Figure 5:
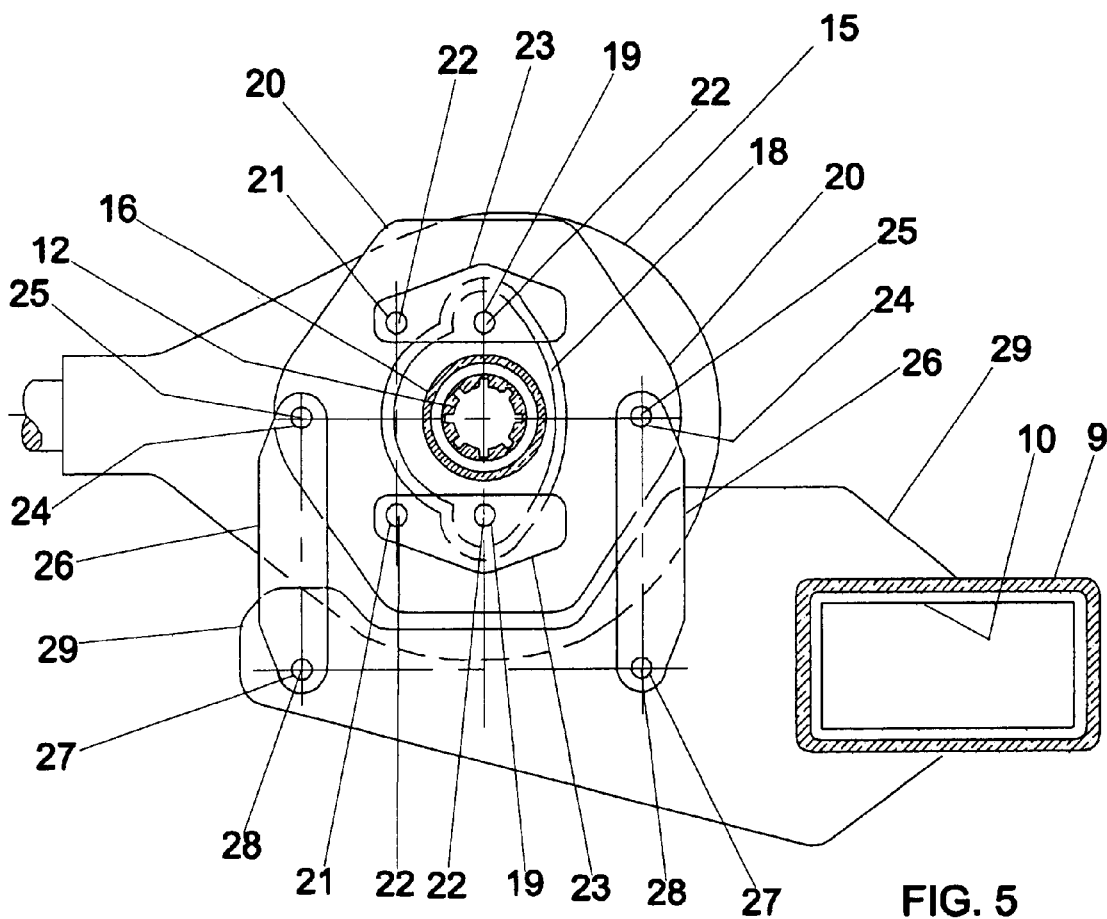
FIG. 5 is an enlarged side view of a device that prevents a differential housing from rotating, allowing a radial displacement of the same.

The plate 20 has further two holes 24 located forwardly and rearwardly of the differential extension. Each hole 24 receives a pin 25 where the ends of four rods 26 articulate, forming two pairs located parallel to each other and leaned against the faces of the plate 20. These rods have holes in the lower ends, in which the pins 28 are inserted. They fit in holes of a plate 29. It rounds with a little gap the external profile of the plate 20 and is solidly fixed to the crossbeam 9 of the suspension. Plates 18, 20 and 29 are located in the same plane, providing maximum stability to the set. The rods have extension that exceeds the junction gaps between the plates so as to guarantee the general alignment as shown in FIG. 5.

The above mentioned set of plates and rods allows the radial displacement of the differential assembly relative to the suspension crossbeam or tube 9, but it does not allow the differential rotation. The eventual displacements allow the set to absorb the disarrangement that may occur in the manufacture of the parts, in greater gaps than the regular ones, in elastic deformations of the rear suspension assembly under intense stress.

When the mechanical transmission for agricultural vehicles of adjustable track width is designed in accordance with the present invention, it is possible to change the track width of the vehicle in motion, reducing to a few seconds the time of this operation.

It will be understood that each of the elements described above, or two or more together, may also find a useful application in other types of constructions differing from the types described above.

While the invention has been illustrated and described as embodied in mechanical transmission for agricultural vehicles of adjustable track width, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mechanical transmission for agricultural vehicles of adjustable track width, comprising gear cases disposed vertically to elevate a chassis height of a vehicle above a plantation; rear axles provided for wheels of the machine and mounted to said gear cases; first gears and second gears located in said gear cases and coupling said axles and also being interconnected with one another; a differential to which torque is transmitted from said axles through said second gears which are upper gears; a crosstube, said gear cases having substantially first horizontal extensions which are fitted on said cross tube so as to allow sliding outwards or inwards of said extensions in order to modify a machine track width, said differential having two second extensions; grooved shafts which are fixedly connected to said second gears; first tube bushings which are connected with said gear cases and in which said grooved shafts are fitted; second bushings having internal grooves and surrounding said grooved shafts; tubes which are fixed to said gear cases concentrically to said gears, said second extensions of said differential being fitted in a sliding and tight way within said tubes concentrically to said second gears, acting as a support to a differential assembly which is suspended by said gear cases.

2. A mechanical transmission as defined in claim 1, wherein said gear cases have bearings in which said rear axles of the wheels are mounted.

3. A mechanical transmission as defined in claim 1, wherein said first extensions of said gear cases are formed as prismatic extensions, wherein said second extensions of said differential being formed as tubular extensions having internal bearings at their ends.

4. A mechanical transmission as defined in claim 1; and further comprising idler gears connecting said first sears and said second gears in said gear cases.

5. A mechanical transmission as defined in claim 1; and further comprising a set of plates disposed in a perpendicular plane to one of said second extensions of said differential.

6. A mechanical transmission as defined in claim 5, wherein said plates includes a first plate welded to said second extension and having two holes with pins inserted in said holes; a second coplanar plate having an opening in which said first plate is lodged and provided with a gap and a contour and with two further holes in which said pins are also lodged, wherein said pins include upper pins and lower pins; and further comprising four rods including two rods mounted in said upper pins and two rods mounted in said lower pins, each pair of said rods being in opposite sides of said plates and leaned against faces of said plates.

7. A mechanical transmission as defined in claim 6, wherein said second plate has two further holes located forwardly and rearwardly of said tubular extension, in which further pins are lodged where an end of said four rods articulate, which form two pairs leaned against opposite faces of said second plate, said further pins extending beyond said second plate and having additional holes with additional pins; and further comprising a third plate in which said additional pins are fitted said third plate being solidly fixed to said cross tube.

* * * * *